United States Patent [19]

Kanai

[11] Patent Number: 4,909,572
[45] Date of Patent: Mar. 20, 1990

[54] AUTOMOTIVE SEAT WITH RECLINING DEVICE

[75] Inventor: Shigeru Kanai, Akishima, Japan

[73] Assignee: Tachi-S Company Limited, Tokyo, Japan

[21] Appl. No.: 323,693

[22] Filed: Mar. 15, 1989

[51] Int. Cl.⁴ ............................................. B60N 1/02
[52] U.S. Cl. ................................. 297/452; 297/354; 297/355
[58] Field of Search ............... 297/452, 353, 354, 355, 297/463; 248/345.1

[56] References Cited

U.S. PATENT DOCUMENTS 3,984,888 10/1976 Delano ........................... 297/354 X
4,252,372 2/1981 Harder, Jr. ......................... 297/452
4,275,925 6/1981 Harder Jr. ........................... 297/452
4,695,097 9/1987 Nuraishi ............................. 297/452
4,789,204 12/1988 Kanazawa ......................... 297/355

Primary Examiner—James T. McCall
Attorney, Agent, or Firm—Browdy and Neimark

[57] ABSTRACT

An automotive seat with a reclining device, in which a pair of the reclining devices are each provided on both lateral sides of said seat, each of the reclining devices being equipped with a locking mechanism, and a connecting means is extended between the two locking mechanisms. A protector is provided at the rear end of a seat cushion of the seat in order to thereby prevent the connecting means from being contacted with a foot of a rear-seat occupant.

8 Claims, 2 Drawing Sheets

AUTOMOTIVE SEAT WITH RECLINING DEVICE

BACKGROUND OF THE INVENTION

1. Field of the Invention

The present invention relates to an automotive seat provided with a reclining device, and particularly relates to a seat of this kind with a pair of reclining devices provided at its seat cushion, each being equipped with a locking mechanisms, in which a crank-like connecting rod or connecting wire is extended between the two locking mechanism at a point rearwardly of the seat cushion.

2. Description of the Prior Art

In most of automobiles, the front seat thereof is provided with a reclining device for adjustably inclining a seat back of the seat relative to a seat cushion of the same. In particular, a pair of each reclining devices are each arranged at the respective rearward lateral sides of the seat cushion, with a locking mechanism equipped at each of the two reclining devices, for the sake of rigid, safe reclining and locking actions.

This dual side-by-side type of reclining device is widely used in many automotive seats, in which, by and large, a connecting means is provided between the two locking mechanisms in order that both two reclining devices are actuated in a synchronized, simultaneous manner. The connecting means entails a crank-like connecting rod or connecting wire, as is most frequently used, and the former is based on a rotation force for the interlocking action of the two reclining devices, while the latter is based on a drawing or pulling force for the same purpose. The reclining adjustment is effected by means of a control lever which is provided at one of the two locking mechanisms, whereby an operator may actuate both two side-by-side locking mechanisms, with his or her one hand, to lock or unlock them.

However, a problem has been with the connecting means, namely, the crank-like connecting rod or connecting wire. That is, in the case of the crank-like connecting rod, although a crank portion is formed by bending part-way the rod with a view to avoiding its undesired contact with the rear side of seat cushion and thus eliminating any unpleasing hard feeling at the buttocks of the occupant of the seat, it has been found defective that the crank portion of the connecting rod is normally oriented in a direction reawardly of the seat cushion or downwardly thereof, hence exposing itself to the outside behind the seat and increasing the possibility that an occupant of the rear seat in the same automobile will accidentally contact his or her foot against or trample on that crank portion. Because the crank portion, under the effect of leverage, transmits even a small force to the connecting rod as an amplified force enough to actuate the two locking mechanisms, the connecting rod per se is then caused to rotate thus releasing the locked state of the reclining device, resulting in an unexpected, sudden inclination of the seat back. Regarding the connecting wire, as it is extended rearwardly of the seat back, exposing itself behind the seat, there is also a great likelihood of the rear-seat occupant contacting his or her food or trampling on the correcting wire, which will draw the wire to release the locked state of the seat back and create the same trouble as stated above.

SUMMARY OF THE INVENTION

It is a first purpose of the present invention to provide an automotive seat with a reclining device which eliminates malfunctions of the reclining device due to contact of the foot of a rear-seat occupant with a connecting rod of the reclining device.

In accomplishing such purpose, in accordance with the present invention, there is provided a protector at the rear part of seat cushion of the seat, such that the connecting rod is disposed within the protector.

Accordingly, the connecting rod is completely isolated by the protector from the exterior of the seat cushion, and thus preventing the connecting rod from being contacted or trampled by the foot of the rear-seat occupant.

It is a second purpose of the present invention to give rigidity to the protector so that it endures an external force.

In accomplishing such purpose, the protector is formed in a substantially channel-shaped or U-shaped configuration in section and is supported by a frame provided in the seat seat cushion.

It is a third purpose of the present invention to improve an aesthetic appearance of the seat with such protector.

For that purpose, the protector is disposed within the rear part of the seat cushion, whereby the protector per se is not exposed to view and thus the original aesthetic appearance of the seat is not impaired.

In one aspect of the present invention, the seat cushion is formed such that the protector, a padding of the seat cushion and the frame of the seat cushion are included together in a mold and formed integrally together. Accordingly, the formation of the seat is expedited and effected smoothly without use of an adhesive for bonding the protector to the seat cushion.

DETAILED DESCRIPTION OF PREFERRED EMBODIMENTS OF THE INVENTION

A description will be made, first, with regard to a first embodiment of the present invention, by referring to FIGS. 1 and 2.

In this particular embodiment, a seat, which is generally designated at (10), is constructed by a seat back (12) and seat cushion (16). As shown, the seat back (12) is connected with the seat cushion (16) via a pair of reclining devices (14)(14), each being provided rearwardly of and at both lateral sides of the seat cushion (16).

Figure 2:
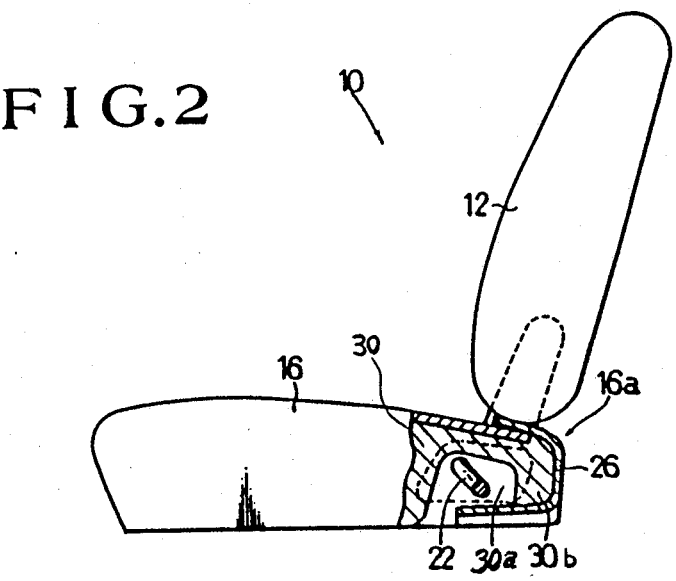
FIG. 2 is a partially cut-away side view of the same seat as in the FIG. 1 to which the protector is attached.

The seat cushion (16), as seen in FIG. 2, is of a know type with reclining device therein, in which its padding (30) is formed at the rear portion thereof with a hollow (30a) through which passes a connecting rod (22) which will be described below, and thus there is defined a rear padding area (30b) at the rear end of the seat cushion (16). The padding (30) is made of a foam material such as a urethane foam.

Figure 1:
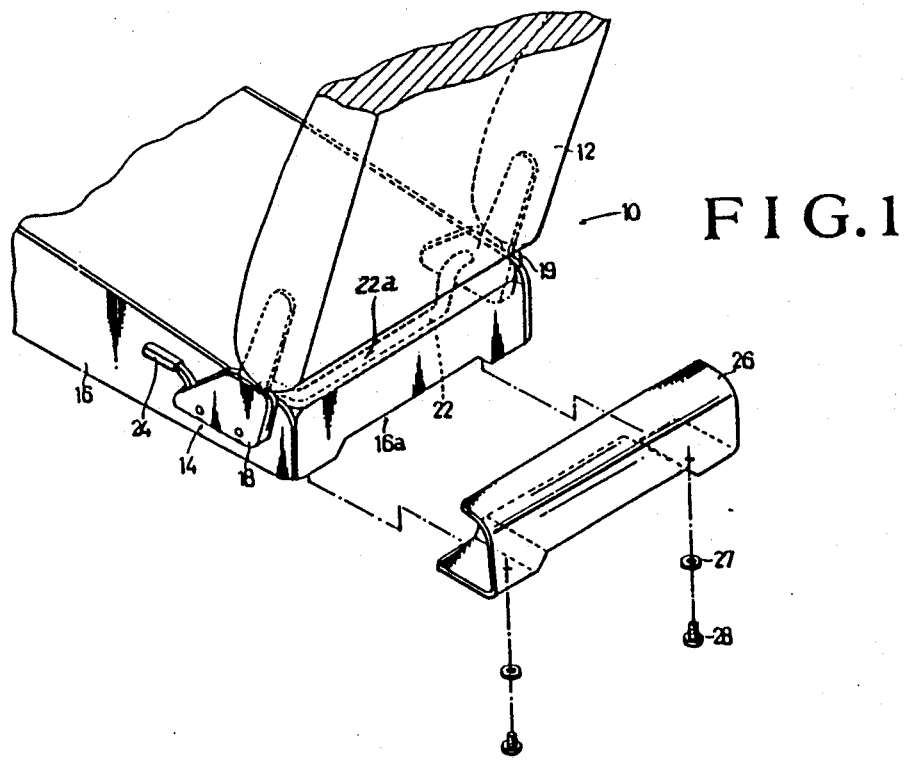
FIG. 1 is a partially broken perspective view of a first embodiment of the present invention, showing that a protector is to be attached thereto.

The two reclining devices (14)(14) are respectively equipped with a pair of locking mechanisms (18)(19), and, as indicated by the phantom line in FIG. 1, a connecting rod (22) is extended between the locking mechanisms (18)(19), thereby establishing an interlocking relation therebetween so as to permit them to lock or unlock the reclining devices (14)(14) in a synchronized, coactive manner. For that purpose, a control lever (24) is provided at one of the two locking mechanisms (18)(19); namely, at the left-side locking mechanism (14), as viewed in FIG. 1, by means of which control lever (24), an operator may actuate those two locking mechanisms (18)(19) simultaneously at one time via the connecting rod (22).

The connecting rod (22) is at its central part formed with a crank portion (22a). The crank portion (22a) is formed by bending such central part of the connecting rod (22) into a substantially U-shaped configuration as illustrated, and is oriented generally downwardly in a direction away from the seating point of the seat cushion (16) where the buttocks of an occupant thereon is supposed to be located and the reverse side or bottom side of the seat cushion (16) is to be flexed down when sat on by the occupant, to thereby avoid contact of the bottom side of the seat cushion (16) with the connecting rod (22) for the purpose of eliminating an unpleasant hard feeling at the occupant's buttocks.

A protector (26) of a channel cross-section is fixed at the rear end part (16a) of the seat cushion (16) by means of two securing screws (28)(28) and washers (27)(27). The protector (26) is made of a metallic plate, hard board, synthetic resin material, or the like, and formed in such channel-shaped configuration in section which serves to cover the rear end part (16a) at its upper side, rear wall side and lower side, as a most preferred mode, as can be seen in FIG. 1. Thus, the protector (26) is given rigidity.

As best shown in FIG. 2, at the rear end part (16a) of the seat cushion (16), the protector (26) is attached firmly by means of two securing screws (28) (28) and washers (27)(27), such that the protector (26) covers the rear padding area (30b) of the padding (30) associated with the seat cushion (16). Thus, it is seen that the connecting rod (22) is disposed within the protector (26) and completely kept away from the exterior of the seat cushion (16).

Accordingly, it is appreciated that the connecting rod (22) is prevented by the protector (26) from being contacted by the foot of a rear-seat occupant in a positive manner, hence insuring the elimination of a malfunction of the reclining devices (14)(14) due to the rear-seat occupant. It is further appreciated that since the protector (26) covers the rear part (16a) of the seat cushion (16) at its both upper and lower sides, the contact of the rear-seat occupant's foot with the connecting rod (22) is avoided in all angles. Downward trampling of the occupant upon the rear part (16a) or upward invasion of his or her tiptoe into the underside of that rear part (16a) does not reach the connecting rod (22).

The protector (26), therefore, is effective in isolating the connecting rod (26) from the exterior at the rear side of the seat cushion (16), and thus from the feet or leg of the seat-rear occupant, completely, which assures preventing the reclining devices (14) from being accidentally unlocked or actuated against the will of the front-seat occupant sitting on the seat (10).

This will apply indeed in the case of a connecting wire (not shown) being used instead of the connecting rod (26). The protector (26) is also effective in protecting such connecting wire against its contact with the feet of the rear seat occupant.

The protector (26) is not limited to the illustrated one, and may be formed in any other shapes insofar as it serves to protect the connecting rod (22) against contact of the rear-seat occupant in all angles.

Figure 3:
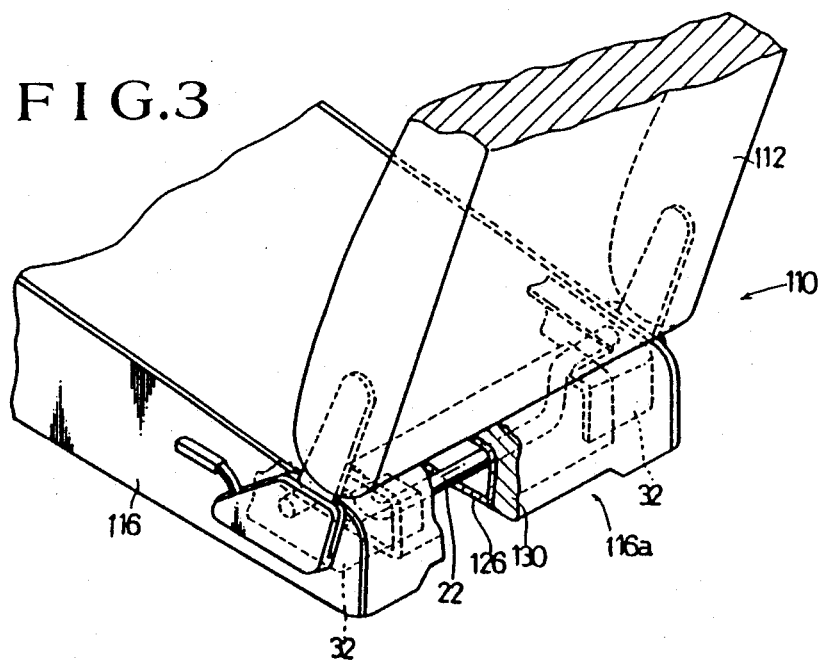
FIG. 3 is a partially broken perspective view of a second embodiment of the present invention.
Figure 4:
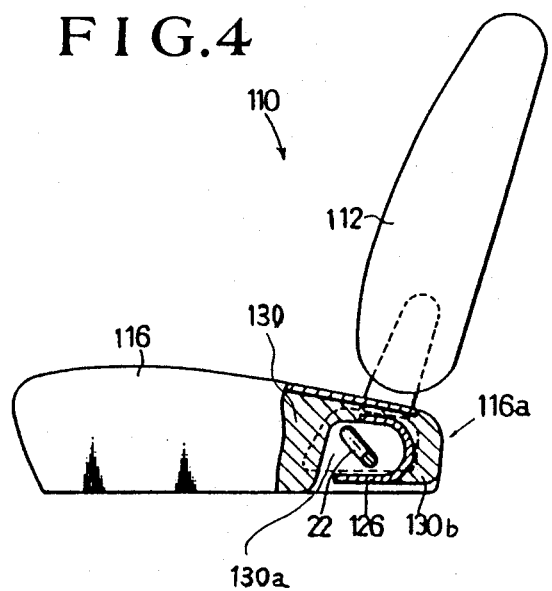
FIG. 4 is a partially cut-away side view of the same seat as in the FIG. 3.

Referring to FIGS. 3 and 4, there is illustrated a second embodiment of the present invention.

In the present embodiment, the same reclining device (14)(14), locking mechanisms (18)(19) and connecting rod (22) are used and provided on a seat (110) which comprises a seat back (112) and a seat cushion (116). The seat cushion (116), similarly to the one (16) of the above-described first embodiment, is a known type with reclining device wherein its padding (130) of urethane foam is at the rear portion thereof formed with a hollow (130a) through which passes the connecting rod (22), and thus a rear padding area (130b) is defined at the rear end of the seat cushion (116).

According to this particular embodiment, as shown in FIGS. 3 and 4, a protector (126) is arranged within the hollow (130a) of the padding (130) associated with the seat cushion (116), the protector (126) being formed in a substantially U-shaped configuration in section to extend over the connecting rod (22) such as to cover the upper side, rear side and lower side of the same rod (22), as best seen in FIG. 4 and made of a material similar to that of the protector (26) of the first embodiment. The formation of the seat cushion (116) is, therefore, such that the padding (130) and protector (126) together with a frame (32) are included together in a molding and then formed together integrally, with care being paid to insure that the protector (126) is generally at its outer surface circumscribed by the inner surface of the padding (30) as shown in FIG. 4 and fixedly supported on the frame (32). Such forming method is advantageous in expediting the assembly of the seat cushion (116) without requiring an adhesive or the like to bond the protector (126) to the seat cushion (116). As shown, the protector (126) is at its both ends juxtaposed on the frame (32) and supported thereby, whereupon the protector (126) is prevented against downward dislocation. It is seen that the protector (126) is disposed within the rear padding area (130b).

Accordingly, it is appreciated that, similarly to the first embodiment, the connecting rod (22) is isolated by the protector (126) from the exterior of seat cushion at its rear side, and thus avoids the contact of rear-seat-occupant's foot with the connecting rod (22) from all angles, which is surely effective in protecting the connecting rod (22) and preventing the reclining devices (14) from being accidentally unlocked or actuated against the will of the front-seat occupant sitting on the seat (110). It is particularly appreciated that the protector (126) is not exposed externally as opposed to the one (26) of the first embodiment, which enhances the aesthetic appearance of the seat (110).

While having described the present invention as above, it should be understood that the invention is not limited to the illustrated embodiments, but any other modifications, replacements and additions will structurally be possible without departing from the scopes and spirits of the appended claims for the invention. For example, the automotive seat in the present invention is not limited to a front seat, but will extend its use in ant other various kinds of seats.

What is claimed is:

1. An automotive seat with a reclining device, in which said seat includes a seat cushion and seat back and said reclining device is provided on both lateral sides of said seat, thereby defining a pair of reclining devices at said seat, each of said reclining devices being equipped with a locking mechanism, and a connecting means is extended between the two locking mechanisms in order to cause locking and unlocking of aid two reclining devices by operation of one of said two locking mechanisms, said seat comprising: a protector supported by means associated with the seat at a rear end portion of said seat cushion, said connecting means being disposed within said protector and spaced therefrom, said protector preventing contact between said connecting means and a foot of an occupant on a rear seat which is disposed behind said seat.

2. The automotive seat according to claim 1, wherein said seat is formed such that said protector and a padding of said seat cushion are formed together integrally.

3. The automotive seat according to claim 1, wherein said connecting means compises a connecting rod with a crank portion formed therein.

4. The automotive seat according to claim 1, wherein said protector is made of a rigid material and formed in a substantially channel-shaped configuration in section such as to cover said connecting means at an upper side, a rear wall side and a lower side of said connecting means.

5. The automotive seat according to claim 1, wherein said protector is provided at said rear end portion of said seat cushion in such a manner as to be exposed externally thereon.

6. The automotive seat according to claim 1, wherein said protector is provided within said seat cushion in such a manner that said protector is circumscribed by an inner surface of a padding of said seat cushion.

7. The automotive seat according to claim 6, wherein said protector is at its both end portions juxtaposed on and supported by a frame of said seat cushion.

8. The automotive seat according to claim 1, wherein said protector is made of one selected from materials consisting of a metallic plate, hard board and synthetic resin.

* * * * *